(12) United States Patent
Sartori et al.

(10) Patent No.: US 10,306,573 B2
(45) Date of Patent: *May 28, 2019

(54) SYSTEM AND METHOD FOR TRANSMITTING A SYNCHRONIZATION SIGNAL

(71) Applicant: Futurewei Technologies, Inc., Plano, TX (US)

(72) Inventors: Philippe Sartori, Plainfield, IL (US); Liang Xia, Beijing (CN); Qiang Li, Beijing (CN); Branislav M. Popovic, Kista (SE); Fredrik Berggren, Kista (SE)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/403,892

(22) Filed: Jan. 11, 2017

(65) Prior Publication Data

US 2017/0127365 A1    May 4, 2017

Related U.S. Application Data (63) Continuation of application No. 14/530,322, filed on Oct. 31, 2014, now Pat. No. 9,615,341.

(Continued)

(51) Int. Cl.
*H04J 3/06* (2006.01)
*H04W 56/00* (2009.01)
(Continued)

(52) U.S. Cl.
CPC .......... *H04W 56/001* (2013.01); *H04J 11/00* (2013.01); *H04J 11/0073* (2013.01); *H04W 4/70* (2018.02);
(Continued)

(58) Field of Classification Search
CPC . H04W 56/001; H04W 4/70; H04W 72/0413; H04W 88/08; H04J 11/0073; H04J 11/00; H04J 2011/0096
See application file for complete search history.

(56) References Cited

U.S. PATENT DOCUMENTS 7,751,490 B2 *  7/2010  Popovic .............. H04J 13/0062
                                                  375/260
8,320,234 B2 * 11/2012  Berggren ............ H04L 27/2655
                                                  370/210

(Continued)

FOREIGN PATENT DOCUMENTS

CN      101641874 A      2/2010
CN      102165840 A      8/2011
(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 11)," 3GPP TS 36.211, v11.4.0, Sep. 2013, 120 pages.

(Continued)

*Primary Examiner* — Phuc H Tran
(74) *Attorney, Agent, or Firm* — Slater Matsil, LLP (57) ABSTRACT

A method for device-to-device (D2D) communications includes generating, by a synchronization source, a primary device-to-device synchronization signal that is different from a primary synchronization signal (PSS) sent by an Evolved NodeB (eNodeB) and an existing uplink (UL) signal sent by device-to-device communications devices, and transmitting, by the synchronization source, the primary device-to-device synchronization signal in a single carrier frequency division multiple access (SC-FDMA) waveform.

30 Claims, 6 Drawing Sheets

Related U.S. Application Data (60) Provisional application No. 61/898,973, filed on Nov. 1, 2013.

(51) Int. Cl.

| | | |
|---|---|---|
| *H04J 11/00* | (2006.01) | |
| *H04W 72/04* | (2009.01) | |
| *H04W 4/70* | (2018.01) | |
| *H04W 88/08* | (2009.01) | |

(52) U.S. Cl.
CPC .. *H04W 72/0413* (2013.01); *H04J 2011/0096* (2013.01); *H04W 88/08* (2013.01)

(56) References Cited

U.S. PATENT DOCUMENTS

| | | | |
|---|---|---|---|
| 8,811,374 B2* | 8/2014 | Charbit | H04W 56/0045 |
| | | | 370/350 |
| 8,923,464 B2* | 12/2014 | Tavildar | H04J 3/0641 |
| | | | 375/356 |
| 9,414,337 B2 | 8/2016 | Kim et al. | |
| 9,439,039 B1 | 9/2016 | Patil et al. | |
| 9,451,570 B2 | 9/2016 | Cheng et al. | |
| 9,509,458 B2 | 11/2016 | Kim et al. | |
| 9,867,230 B2 | 1/2018 | Ro et al. | |
| 2007/0254656 A1 | 11/2007 | Dalsgaard | |
| 2008/0043668 A1 | 2/2008 | Chen et al. | |
| 2008/0273582 A1 | 11/2008 | Gaal et al. | |
| 2008/0310567 A1* | 12/2008 | Popovic | H04L 7/043 |
| | | | 375/354 |
| 2009/0086713 A1 | 8/2009 | Luo | |
| 2009/0323629 A1 | 12/2009 | Lindoff et al. | |
| 2010/0034305 A1 | 2/2010 | Popovic | |
| 2010/0135150 A1* | 6/2010 | Berggren | H04L 27/2655 |
| | | | 370/210 |
| 2010/0195479 A1 | 8/2010 | Lipka et al. | |
| 2010/0272055 A1 | 10/2010 | Noh et al. | |
| 2011/0182280 A1* | 7/2011 | Charbit | H04W 56/0045 |
| | | | 370/350 |
| 2011/0280200 A1 | 11/2011 | Fuchs et al. | |
| 2012/0014349 A1 | 1/2012 | Chung et al. | |
| 2012/0134443 A1* | 5/2012 | Popovic | H04L 7/043 |
| | | | 375/316 |
| 2013/0034130 A1* | 2/2013 | Forenza | H04B 7/0417 |
| | | | 375/219 |
| 2013/0229998 A1 | 9/2013 | Noh et al. | |
| 2013/0288608 A1 | 10/2013 | Fwu et al. | |
| 2013/0294437 A1* | 11/2013 | Tsai | H04W 76/023 |
| | | | 370/350 |
| 2014/0010108 A1* | 1/2014 | Tavildar | H04W 8/005 |
| | | | 370/254 |
| 2014/0029602 A1 | 1/2014 | Han et al. | |
| 2014/0064263 A1* | 3/2014 | Cheng | H04W 8/005 |
| | | | 370/350 |
| 2014/0099950 A1* | 4/2014 | Mildh | H04W 56/001 |
| | | | 455/434 |
| 2014/0286293 A1* | 9/2014 | Jang | H04L 5/0044 |
| | | | 370/329 |
| 2014/0341208 A1 | 11/2014 | Charbit et al. | |
| 2014/0348063 A1 | 11/2014 | Kang et al. | |
| 2015/0117375 A1* | 4/2015 | Sartori | H04W 56/001 |
| | | | 370/329 |
| 2015/0124579 A1 | 5/2015 | Sartori et al. | |
| 2015/0304149 A1 | 10/2015 | Kim et al. | |
| 2016/0014774 A1* | 1/2016 | Seo | H04L 5/0037 |
| | | | 370/336 |
| 2016/0073408 A1 | 3/2016 | Sartori et al. | |
| 2016/0205644 A1* | 7/2016 | Seo | H04W 56/00 |
| | | | 370/350 |
| 2016/0212724 A1* | 7/2016 | Seo | H04W 56/0025 |
| 2016/0242131 A1* | 8/2016 | Popovic | H04B 1/7073 |
| 2016/0286506 A1 | 9/2016 | Chae et al. | |
| 2016/0337159 A1 | 11/2016 | Seo et al. | |
| 2017/0127365 A1 | 5/2017 | Sartori et al. | |
| 2017/0202057 A1 | 7/2017 | Ro et al. | |
| 2017/0230926 A1 | 8/2017 | Seo et al. | |
| 2017/0273041 A1 | 9/2017 | Seo et al. | |

FOREIGN PATENT DOCUMENTS

| | | |
|---|---|---|
| CN | 102769868 A | 11/2012 |
| CN | 102780993 A | 11/2012 |
| CN | 103068032 A | 4/2013 |
| CN | 103108389 A | 5/2013 |
| CN | 103108405 A | 5/2013 |
| CN | 103379617 A | 10/2013 |
| JP | 2017502550 A | 1/2017 |
| RU | 2439831 C2 | 1/2012 |
| WO | 2015065017 A1 | 5/2015 |

OTHER PUBLICATIONS

LTE, "3rd Generation Partnership Project; Technical Specification Group Services and System Aspects; Feasibility study for Proximity Services (ProSe) (Release 12)," 3GPP TR 22.803 V12.0.0, Technical Report, Dec. 2012, 40 pages.

Ericsson, et al., "WF on the D2D Synchronization Procedure," R1-134925, 7.2.8.1.1, Oct. 11, 2013, 4 pages.

LG Electronics, "On the Design of D2DSS and PD2DSCH," 3GPP TSG RAN WG1 Meeting #76, R1-140839, Prague, Czech, Feb. 10-14, 2014, 8 pages.

Popovic, B.M., et al., "Primary Synchronization Signal in E-UTRA," Spread Spectrum Techniques and Applications, IEEE 10th International Symposium, Aug. 25-28, 2008, 5 pages.

Tsai, et al., "Enhanced Performance for an Approximately MAI-Free Multiaccess OFDM Transceiver by Code Selection," IEEE 60th Vehicular Technology Conference, vol. 6, Sep. 26-29, 2004, 5 pages.

3rd Generation Partnership Project; Technical Specification Group, Radio Access Network; Evolved Universal Terrestrial Radio Access (E-UTRA); Physical Channels and Modulation (Release 8), 3GPP TS 36.211, V8.5.0, Dec. 2008, 82 pages.

Nokia, et al., "UE based D2D synchronization scheme," 3GPP TSG-RAN WG1 Meeting #74bis, R1-134536, Guangzhou, China, Oct. 7-11, 2013, 4 pages.

Ericsson, "WF on D2D Terminology for Synchronization," 3GPP TSG-RAN WG1 Meeting #74bis, R1-134883, Oct. 9, 2013, 5 pages.

Huawei, et al., "Design considerations for D2DSS," 3GPP TSG RAN WG1 Meeting #76, R1-140207, Prague, Czech Republic, Feb. 10-14, 2014, 8 pages.

Huawei, et al., "Design considerations for D2DSS," 3GPP TSG RAN WG1 Meeting #75, R1-135532, San Francisco, USA, Nov. 11-15, 2013, 5 pages.

"WF on the D2D Synchronization Procedure," 3rd Generation Partnership Project (3GPP), Mobile Competence Centre; F-06921, R1-134925, 7.2.8.1.1, France, Oct. 11, 2013, 4 pages.

"On the Design of D2DSS and PD2DSCH," Agenda Item: 7.2.8.11, Source: LG Electronics, Document for: Discussion and Decision, 3GPP TSG RAN WG1 Meeting #76, R1-140839, Prague, Czech, Feb. 10-14, 2014, 8 pages.

MCC Support, "Draft Report of 3GPP TSG RAN WG1 #74bis v0.2.0," 3GPP TSG RAN WG1 Meeting #75, R1-13xxxx, San Francisco, USA, Nov. 11-15, 2013, 89 pages.

Ericsson, "WF on D2D Terminology for Synchronization," R1-134883, Oct. 9, 2013, 5 pages.

Huawei, "P-SCH sequences," TSG RA WG1 meeting #49, R1-072321, Kobe, Japan, May 7-11, 2007, 6 pages.

3rd Generation Partnership Project; Technical Specification Group Radio Access Network; Evolved Universal Terrestrial Radio Access (E-UTRA); Physical Channels and Modulation (Release 8), 3GPP TS 36.211 V8.8.0, Sep. 2009, 83 pages.

Fujitsu, "Comparison of SC-FDMA and OFDMA for multiple access schemes for D2D link," 3GPP TSG-RAN WG1 Meeting #74bis, R1-134260, Guangzhou, Guangdong, P.R.China, Oct. 7-11, 2013, 2 pages.

(56) References Cited

OTHER PUBLICATIONS

ZTE, "PD2DSS root indices selection," 3GPP TSG-RAN WG1 #78bis, R1-143813, Ljubljana, Slovenia, Oct. 6-10, 2014, 7 pages.

3rd Generation Partnership Project; Technical Specification Group Radio Access Network; Evolved Universal Terrestrial Radio Access (E-UTRA); Multiplexing and channel coding (Release 11), 3GPP TS 36.212 V11.3.0, Jun. 2013, 84 pages.

3rd Generation Partnership Project; Technical Specification Group Radio Access Network; Evolved Universal Terrestrial Radio Access (E-UTRA); Physical layer procedures (Release 11), 3GPP TS 36.213 V11.4.0, Sep. 2013, 182 pages.

3rd Generation Partnership Project; Technical Specification Group Radio Access Network; Evolved Universal Terrestrial Radio Access (E-UTRA); Radio Resource Control (RRC); Protocol specification (Release 11), 3GPP TS 36.331 V11.5.0, Sep. 2013, 347 pages.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), 3GPP TS 36.300 V11.7.0, Sep. 2013, 209 pages.

3rd Generation Partnership Project; Technical Specification Group Radio Access Network; Evolved Universal Terrestrial Radio Access (E-UTRA); Medium Access Control (MAC) protocol Specification (Release 11), 3GPP TS 36.321 V11.3.0, Jun. 2013, 57 pages.

3rd Generation Partnership Project; Technical Specification Group Radio Access Network; Evolved Universal Terrestrial Radio Access (E-UTRA); User Equipment (UE) procedures in idle mode (Release 11), 3GPP TS 36.304 V11.5.0, Sep. 2013, 34 pages.

3rd Generation Partnership Project;Technical Specification Group Radio Access Network; Evolved Universal Terrestrial Radio Access (E-UTRA); LTE physical layer; General description (Release 11), 3GPP TS 36.201 V11.1.0, Dec. 2012, 13 pages.

* cited by examiner

SYSTEM AND METHOD FOR TRANSMITTING A SYNCHRONIZATION SIGNAL

CROSS-REFERENCE TO RELATED APPLICATIONS

This application is a continuation of U.S. patent application Ser. No. 14/530,322, filed on Oct. 31, 2014, entitled "System and Method for Transmitting a Synchronization Signal," which claims the benefit of U.S. Provisional Application No. 61/898,973, filed on Nov. 1, 2013, entitled "System and Method for Transmitting a Synchronization Signal," both of which applications are hereby incorporated herein by reference.

TECHNICAL FIELD

The present invention relates to wireless communications, and, in particular embodiments, to a system and method for transmitting a synchronization signal.

BACKGROUND

Device-to-Device (D2D) technology is receiving a lot of attention because of the ability to offer new services, improve system throughput, and offer a better user experience. A variety of potential use cases for D2D have been identified.

In order to ensure successful D2D communications, synchronization is crucial: D2D transmitting and receiving user equipments (UEs) should acquire the same time and/or frequency synchronization from synchronization source(s). These sources need to periodically transmit at least a D2D synchronization signal (D2DSS) to ensure D2D UEs derive time and/or frequency synchronization. The synchronization source could be a base station, an evolved NodeB (eNodeB) (like a traditional Third Generation Partnership Project (3GPP) Long Term Evolution (LTE) network), or a D2D UE which is relaying the downlink (DL) synchronization channel from an eNodeB.

SUMMARY

Example embodiments of the present disclosure which provide a system and method for transmitting a synchronization signal.

In accordance with an example embodiment of the present disclosure, a method for device-to-device communications is provided. The method includes generating, by a synchronization source, a primary device-to-device synchronization signal that is different from a primary synchronization signal (PSS) sent by an Evolved NodeB (eNodeB) and an existing uplink (UL) signal sent by device-to-device communications devices, and transmitting, by the synchronization source, the primary device-to-device synchronization signal in a single carrier frequency division multiple access (SC-FDMA) waveform.

In accordance with another example embodiment of the present disclosure, a method of operating a device-to-device communications device is provided. The method includes receiving, by the device-to-device communications device, a plurality of physical resource blocks (PRBs) including a primary device-to-device synchronization signal that is different from a primary synchronization signal (PSS) sent by an Evolved NodeB (eNodeB) and an existing uplink (UL) signal sent by device-to-device communications devices, wherein the primary device-to-device synchronization signal is transmitted in a single carrier frequency division multiple access (SC-FDMA) waveform. The method also includes detecting, by the device-to-device communications device, the primary device-to-device synchronization signal in the plurality of PRBs, and synchronizing, by the device-to-device communications device, in accordance with the primary device-to-device synchronization signal.

In accordance with another example embodiment of the present disclosure, a synchronization source is provided. The synchronization source includes a processor, and a transmitter operatively coupled to the processor. The processor generates a primary device-to-device synchronization signal that is different from a primary synchronization signal (PSS) sent by an Evolved NodeB (eNodeB) and an existing uplink (UL) signal sent by device-to-device communications devices. The transmitter transmits the primary device-to-device synchronization signal in a single carrier frequency division multiple access (SC-FDMA) waveform.

In accordance with another example embodiment of the present disclosure, a method for device-to-device communications is provided. The method includes generating, by a synchronization source, a primary device-to-device synchronization signal in accordance with $$s_u(t) = \sum_{k=-N/2}^{N/2-1} H_u[k] \cdot e^{j2\pi(k+\delta)\Delta f t}, 0 \le t < \frac{1}{\Delta f} = N \cdot T_s,$$

and wherein the primary device-to-device synchronization sequence is mapped to at most N Fourier coefficients of H[ ], where $T_s$ is a sampling period, $\Delta f$ is a subcarrier spacing, u is a first root index, N is an integer value, and $\delta = \frac{1}{2}$. The method also includes transmitting, by the synchronization source, the primary device-to-device synchronization signal in a single carrier frequency division multiple access (SC-FDMA) waveform.

One advantage of an embodiment is that the use of centrally symmetric signals simplifies decoding complexity.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

The present disclosure will be described with respect to example embodiments in a specific context, namely communications systems that use a synchronization signal to facilitate D2D communications. The disclosure may be applied to standards compliant communications systems, such as those that are compliant with Third Generation Partnership Project (3GPP), IEEE 802.11, and the like, technical standards, and non-standards compliant communications systems, that use a synchronization signal to facilitate D2D communications.

Figure 1:
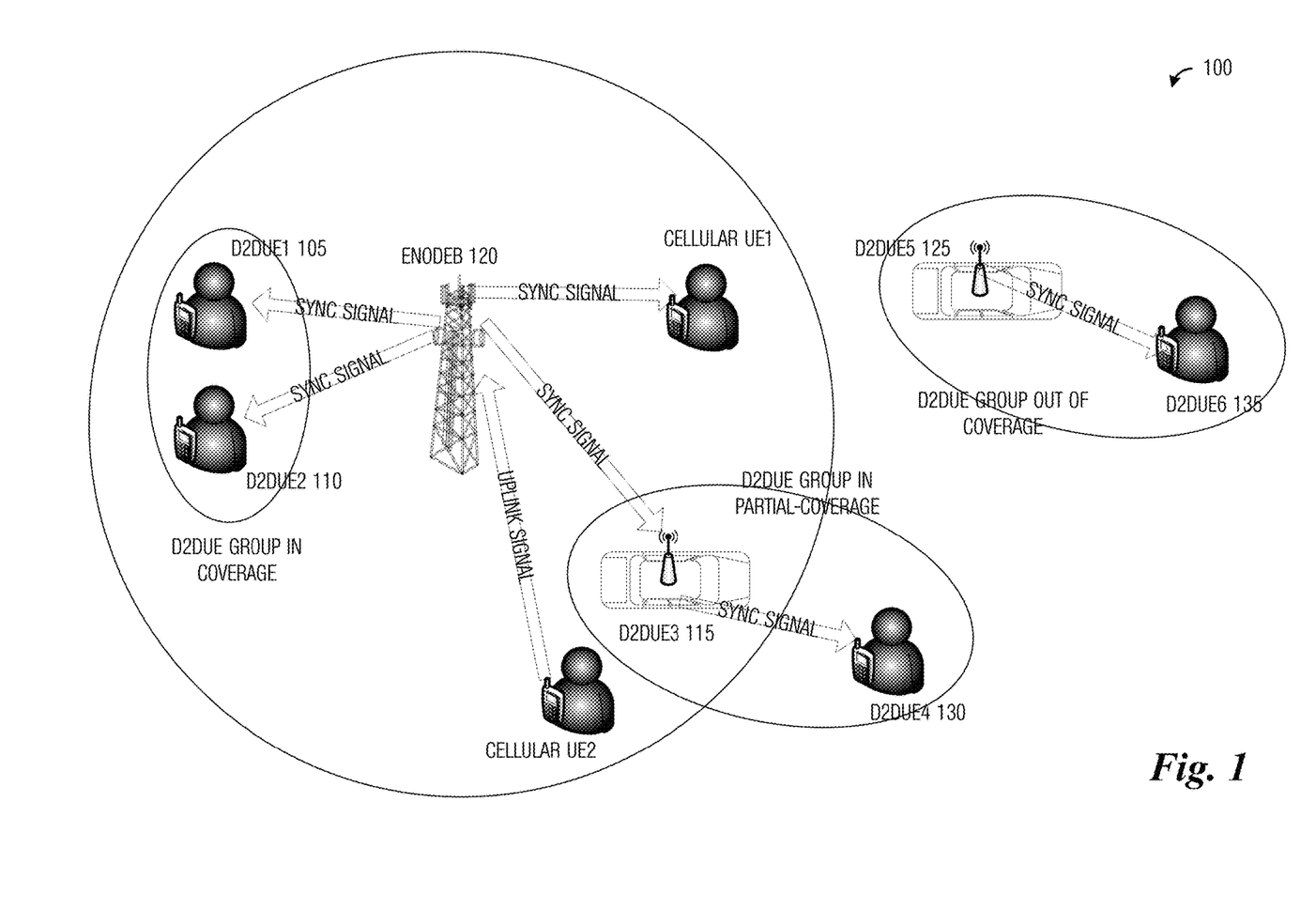
FIG. 1 illustrates an example communications system according to example embodiments described herein.

FIG. 1 illustrates an example communications system 100. Communications system 100 supports D2D communications and may therefore be referred to as a D2D system. D2D synchronization in a D2D system is highlighted in FIG. 1. As illustrated in FIG. 1, D2DUE1 105, D2DUE2 no, and D2DUE3 115 may derive time and/or frequency synchronization based on legacy LTE DL synchronization channel, such as primary synchronization signal (PSS) and secondary synchronization signal (SSS), sent by eNodeB 120, or other synchronization signals sent by eNodeB 120. At the same time, D2DUE3 115 and D2DUE5 125 also play the role of synchronization sources (i.e., D2D synchronization sources) for D2DUE4 130 and D2DUE6 135, respectively. eNodeBs may also be commonly referred to as NodeBs, controllers, base stations, access points, base terminal stations, and the like. Similarly, UEs may also be commonly referred to as mobile stations, mobiles, terminals, users, stations, subscribers, and the like. While it is understood that communications systems may employ multiple eNodeBs capable of communicating with a number of UEs, only one eNodeB, and a number of UEs are illustrated for simplicity.

Discovery is a D2D technique that includes the ability to discover neighboring UEs. Discovery can be either eNodeB-assisted discovery or open discovery. With eNodeB-assisted discovery, a first UE is directed to transmit a signal (e.g., a sounding reference signal (SRS)), and a second UE is required to listen and report the signal quality to the eNodeB. The eNodeB may, based on this reported signal quality, decide if ProSe can be enabled for these two UEs. With open discovery, any UE may transmit a signal, such as a beacon signal, to advertise its presence to other UEs. It is noted that this process can possibly involve idle UEs.

Given that open discovery may involve idle UEs, it is typically performed with very limited available information. In particular, the UEs typically have to rely on the information broadcasted by the eNodeB. It may be too costly in most situations to wake up these UEs and transmit radio resource control (RRC) signaling to them. Furthermore, the location of idle UEs is approximate, and the exact cell where the UEs are camping is not known by the communications system.

For D2D communication, it is also generally assumed that D2D occurs on the uplink (UL) portion of the bandwidth since the interference would be less prejudicial to cellular UEs on the UL. On the UL, a transmitting D2D UE interferes with the eNodeB. Consequently, as long as the D2D UE is at a reasonable distance from the eNodeB, the interference created by the D2D UE has little impact. Conversely, on the DL, D2D interference affects neighboring UEs, and potentially their ability to receive synchronization channels and PDCCH is affected, and can result in significantly higher impact than if the D2D UE were transmitting on the UL.

Figure 2:
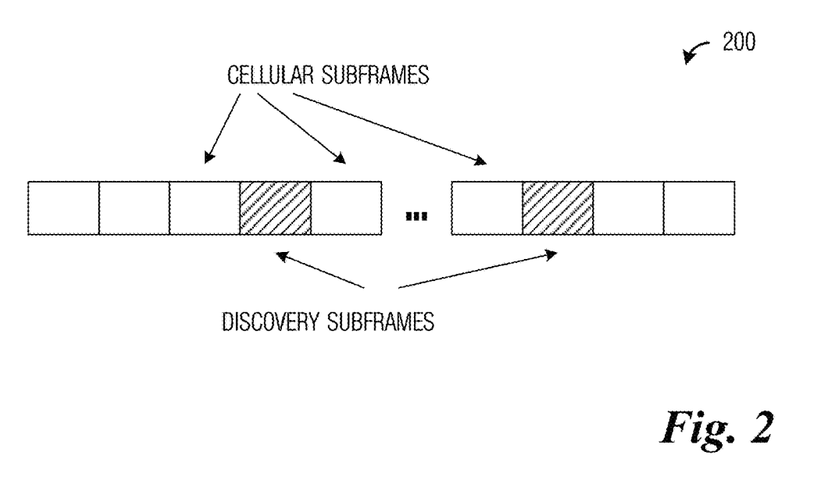
FIG. 2 illustrates example subframes according to example embodiments described herein.

Given that D2D communication takes place on the UL, it is reasonable to assume that the D2D discovery occurs on the UL as well. For open discovery, a given number of subframes (e.g., 1%) are reserved for discovery. During these subframes, there usually is no cellular communication at all. Only UE discovery signals are transmitted. FIG. 2 illustrates example subframes 200. Some of the subframes 200 are used as discovery subframes (shown as cross-hatched boxes), while others are used as cellular subframes (shown as unshaded boxes).

According to an example embodiment, example D2D synchronization signals are provided. The design principles of D2DSS may include one or more of the following:
  good self-correlation and cross-correlation characteristics, such as with traditional PSS (e.g., based on ZC sequences);
  different from traditional PSS to avoid causing ambiguity to the D2D UEs and just-turning-on cellular UEs;
  good cross-correlation characteristics regarding the overlap with uplink signals, such as uplink demodulation reference signal (DMRS), since the D2D signal would be transmitted in UL spectrum/subframe;
  possible indication of D2D operating parameters, thereby permitting D2D UEs to quickly obtain D2D configuration information; and
  possible support of fine time and/or frequency synchronization based on the D2DSS, while in an LTE system PSS and/or SSS could only support coarse time and/or frequency synchronization.

In addition, backwards compatibility can be ensured since a legacy UE should not be able to detect the D2DSS, which would prevent the legacy UE from mistakenly assuming that a D2D UE (source of the D2DSS) is an eNodeB. It is noted that the example embodiments described herein can be combined.

Moreover, the detection of a D2DSS typically encompasses some form of matched filtering in the receiver, e.g., determining a correlation between the received signal and the D2DSS. Since this involves performing large amounts of complex-valued multiplications, it is an objective to design the D2DSS such that it exhibits signal properties which may be used for reducing the detection complexity.

Figure 3:
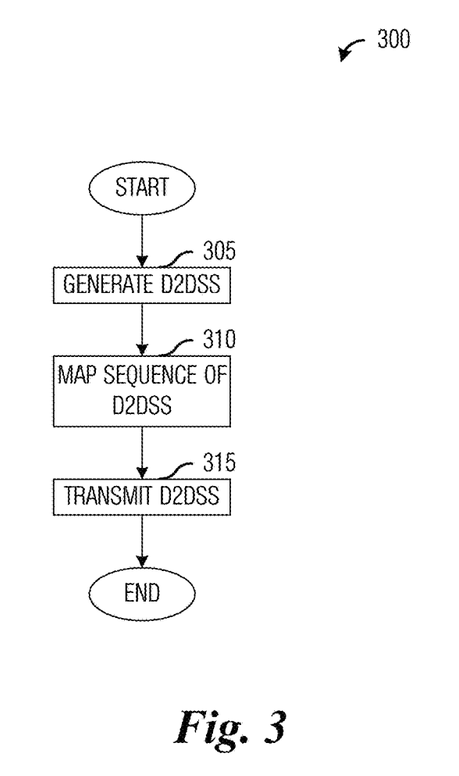
FIG. 3 illustrates a flow diagram of example operations occurring in a D2D UE according to example embodiments described herein.

FIG. 3 illustrates a flow diagram of example operations 300 occurring in a D2D UE. Operations 300 may be indicative of operations occurring in a D2D UE.

Operations 300 may begin with the D2D UE generating a D2DSS (block 305). The D2D UE may generate a sequence for the D2DSS (e.g., a PD2DSS and/or a SD2DSS). Details of example embodiments of D2DSS are presented below. The D2D UE may map the sequence of the D2DSS, producing a mapped D2DSS (block 310). The D2D UE may map the sequence of the D2DSS to subcarriers so that the D2DSS is centrally symmetric, for example. The D2D UE may transmit the mapped D2DSS (block 315). As discussed previously, the mapped D2DSS may be transmitted in UL resources or subframes.

According to an example embodiment, a D2DSS is based on a ZC sequence with a length that differs from the length of other ZC sequences used in the communications system. A synchronization source transmits a D2DSS based on which a group of D2D UEs (making up a D2D group) derives the time and/or frequency synchronization. The D2DSS may include at least a primary D2DSS (PD2DSS), where the PD2DSS is generated from a first ZC sequence, where the length of the first ZC sequence is different from the length of a second ZC sequence used to generate a legacy LTE PSS sent by eNodeB (the ZC sequence used to generate the legacy LTE PSS is a length 63 sequence, whose central element is punctured in order to produce a length 62 sequence), as well as any possible ZC sequence used to generate existing UL reference signals (including DMRS and SRS) sent by UEs.

In a first example, a synchronization source, either an eNodeB or D2D UE, transmits a D2DSS based on which group of D2D UEs (making up a D2D group) derives the time/frequency synchronization. The D2DSS should include at least a primary D2DSS (PD2DSS), where the PD2DSS is generated from a first ZC sequence, and where the length of the first ZC sequence is different from the length of a second ZC sequence used to generate the legacy LTE PSS. The use of different length ZC sequences ensures that there will not be a false detection of a D2D UE as an eNodeB. In other words, the PD2DSS will not be mistaken as a PSS. In addition, the ZC sequence length is different from any possible length of ZC sequence used to generate existing UL reference signals (including DMRS and SRS) sent by UEs.

Furthermore, the length of the first ZC sequence should be a prime number or a number whose second smallest positive submultiple is larger than 3.

Figure 4:
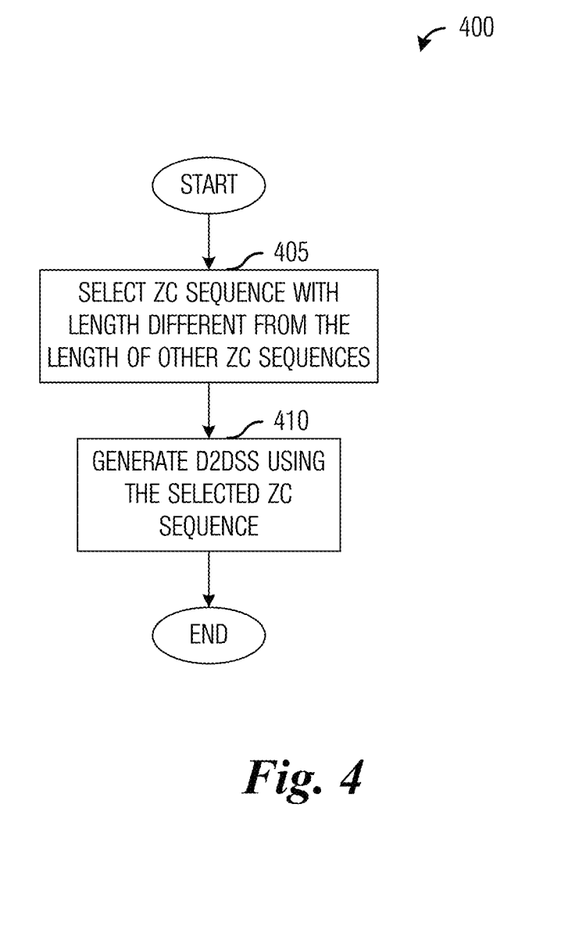
FIG. 4 illustrates a flow diagram of example operations occurring in a D2D UE as the D2D UE generates a D2DSS according to example embodiments described herein.

FIG. 4 illustrates a flow diagram of example operations 400 occurring in a D2D UE as the D2D UE generates a D2DSS. Operations 400 may be indicative of operations occurring in a D2D UE as the D2D UE generates a D2DSS.

Operations 400 may begin with the D2D UE selecting a first ZC sequence with a length that is different from the length of a second ZC sequence used to generate a legacy LTE PSS (block 405). Furthermore, the length of the first ZC sequence is also different from the length of other ZC sequences used to generate existing signals transmitted by the D2D UE, such as UL reference signals (including DMRS and SRS). Additionally, the length of the first ZC sequence may be a prime number or a number whose second smallest positive number is larger than 2. The D2D UE may generate the D2DSS using the first ZC sequence (block 410).

Operations 400, as described herein, focus on the D2D UE generating the D2DSS. However, it may be possible for a different entity in the communications system to generate the D2DSS for the D2D UE and provide the D2DSS to the D2D UE. Operations 400 may be performed any entity in the communications system. Therefore, the discussion of the D2D UE performing operations 400 should not be construed as being limiting to either the scope or the spirit of the example embodiments.

Based on the discussion, the length of the ZC sequence used for the D2DSS (e.g., PD2DSS) may be derived, assuming that the synchronization source transmits PD2DSS within 6 physical resource blocks (PRBs) (72 subcarriers, as is the legacy LTE PSS) in frequency domain. The length of the ZC sequence may be determined based on following principles:

a prime number or a number whose second smallest positive submultiple is larger than 3;

not be 63 (the length of the ZC sequence used for the legacy LTE PSS); and not be 71, 31 or 47, where 71, 31, 47 are possible lengths ZC sequences used for UL DMRS.

If all the principles are complied with, the length of the first ZC sequence may be 61, 65, or 67. It is noted that 67 is the maximum value which is not larger than 72 and satisfies above principles, while 61 is the maximum value which is not larger than 64 and satisfies above principles, and 65 is a value whose second smallest positive submultiple is 5 and satisfies above principles. In a typical receiver, the sampling rate may only take certain values, e.g., being a power of 2. As an illustrative example, if the sequence length is up to 64, a receiver window of 64 samples may be utilized, and, similarly, if the sequence length is larger than 64 but less than 128, a receiver window of 128 samples may be utilized. The receiver window length is related to the amount of complex-valued multiplications needed to detect the PD2DSS. Comparing 61 and 67 as possible length values, if the length of the first ZC sequence is 61, only 64 complex samples are needed per PD2DSS, which results in lower complexity. If the length of the first ZC sequence is 67, 128 complex samples are needed per PD2DSS, which result in higher complexity. On the other hand, lower cross correlation could be achieved if the length of the first ZC sequence is 67. Thus, this length should be considered as well if it significantly improves performance.

A ZC sequence with odd length (e.g., N=61) may be defined as $$x_u(m) = e^{-j\frac{\pi u m(m+1)}{N}}, 0 \le m \le N-1$$

where u is root index, $0<u\le N-1$.

The candidate root indices for PD2DSS should be selected to achieve as low cross correlation with legacy PSS as possible. That is, the candidate indices should be selected within {4, 7, 9, 11, 13, 15, 16, 17, 18, 19, 23, 29, 32, 38, 42, 43, 44, 45, 46, 48, 50, 52, 54, 57}.

The synchronization source may comprise at least a D2DSS, where the D2DSS also should comprise a secondary D2DSS (SD2DSS), where the SD2DSS is generated by a first m-sequence, where the length of the SD2DSS should be different from the length legacy SSS sent by an eNodeB and/or different from the length of the first ZC sequence. This ensures better synchronization, and enables the transmitting node to transmit additional information, such as a frame index or equivalent if it is out-of-coverage. In addition, the sequence length and the bandwidth of SD2DSS should be equal to or larger than that for the PD2DSS.

The root index of the first ZC sequence may be decided, according to at least one of the following:
bandwidth of SD2DSS; and
the root index of the first ZC sequence and/or the first m-sequence is decided according to at least one of the following aspects,
D2D operating bandwidth;
identity of the synchronization source, e.g., UE-ID if source is a D2D UE;
type of the synchronization source, including eNodeB or D2D UE;
priority of the synchronization source;
identity of the D2DUE group;
type of the D2DUE group; and
priority of the D2DUE group.

The root index of ZC sequence for a PD2DSS (among all candidates mentioned above) may also convey the information related to the location and/or bandwidth of the corresponding SD2DSS, as well as the D2D operating bandwidth of this D2D group, where the candidate bandwidths include 1.4 MHz, 3 MHz, 5 MHz, 10 MHz, 15 MHz or 20 MHz (6RB, 15RB, 25RB, 50RB, 75RB, or 100RB, where RB is resource block defined in LTE system). An example of the use of such an indication is illustrated in Table 1 below.

TABLE 1

Root index for the PD2DSS and corresponding bandwidth of SD2DSS

| Bandwidth | Root index |
| --- | --- |
| 6 RB | 19 |
| 15 RB | 23 |
| 25 RB | 29 |
| 50 RB | 32 |
| 75 RB | 38 |
| 100 RB | 42 |

In this situation, the length and bandwidth of the SD2DSS may be different from those of the PD2DSS, respectively. It is noted that the larger bandwidth of SD2DSS (than that of the PD2DSS) may help the D2D UEs within the D2D group to achieve fine time and/or frequency synchronization, which is different from the design target of PSS and/or SSS in the LTE communications system.

According to an example embodiment, a D2DSS is based on a ZC sequence with a different root index for the ZC sequence. In general, two sequences generated from a single sequence but with different root indices will be different sequences. Another solution may be derived assuming that the synchronization source transmits PD2DSS within 6 PRBs (72 subcarriers, like the legacy LTE PSS) in the frequency domain. The first ZC sequence for the PD2DSS may be decided based on following principles:
  a prime number or a number whose second smallest positive submultiple is larger than 3;
  the length should be 71, where 71 is a possible length of the UL DMRS for 6 PRBs transmission;
  root indices should be different from root indices used by the UL DMRS for 6 PRBs transmission;
  if all the principles are complied with, the length of the first ZC sequence may be 71. The candidate root indices of the first ZC sequence should be selected from within set {0, 1, 8, 15, 24, 31, 40, 47, 56, 63}.

Figure 5:
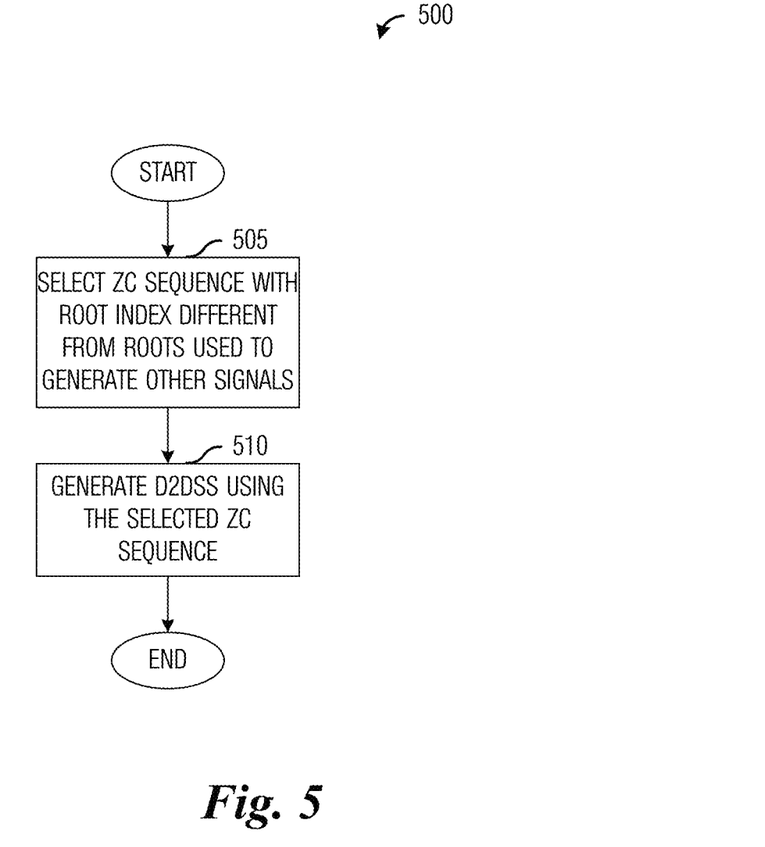
FIG. 5 illustrates a flow diagram of example operations occurring in a D2D UE as the D2D UE generates a D2DSS in accordance with a ZC sequence with a different root index according to example embodiments described herein.

FIG. 5 illustrates a flow diagram of example operations 500 occurring in a D2D UE as the D2D UE generates a D2DSS in accordance with a ZC sequence with a different root index. Operations 500 may be indicative of operations occurring in a D2D UE as the D2D UE generates a D2DSS in accordance with a ZC sequence with a different root index.

Operations 500 may begin with the D2D UE selecting a first ZC sequence with a root index that is different from the root index of a second ZC sequence used to generate a legacy LTE PSS (block 505). Furthermore, the root index of the first ZC sequence is also different from the root index of other ZC sequences used to generate existing signals transmitted by the D2D UE, such as UL reference signals (including DMRS and SRS). Additionally, the length of the first ZC sequence may be the length of the sequence used to generate the UL DMRS. The D2D UE may generate the D2DSS using the first ZC sequence (block 510).

Operations 500, as described herein, focus on the D2D UE generating the D2DSS. However, it may be possible for a different entity in the communications system to generate the D2DSS for the D2D UE and provide the D2DSS to the D2D UE. Operations 500 may be performed any entity in the communications system. Therefore, the discussion of the D2D UE performing operations 500 should not be construed as being limiting to either the scope or the spirit of the example embodiments.

Furthermore, the D2DSS may also comprise a secondary D2DSS (SD2DSS), where the SD2DSS is generated by an m-sequence, with the length and occupied bandwidth of the SD2DSS being different from that of the legacy SSS sent by an eNodeB.

The root index of ZC sequence for a PD2DSS (among all candidates mentioned above) may also convey the information of the location and/or bandwidth of the corresponding SD2DSS, as well as the D2D operating bandwidth by this D2D group, where the candidate bandwidths include 1.4 MHz, 3 MHz, 5 MHz, 10 MHz, 15 MHz or 20 MHz (6RB, 15RB, 25RB, 50RB, 75RB, 100RB, where RB is a resource block defined in LTE system). An example of the use of such an indication is illustrated in Table 2 below.

TABLE 2

Root index for the PD2DSS and corresponding bandwidth of SD2DSS

| Bandwidth | Root index |
| --- | --- |
| 6 RB | 15 |
| 15 RB | 24 |
| 25 RB | 31 |
| 50 RB | 40 |
| 75 RB | 47 |
| 100 RB | 56 |

In this situation, the length and bandwidth of the SD2DSS may be different from those of the PD2DSS, respectively. It is noted that the larger bandwidth of SD2DSS (than that of the PD2DSS) may help the D2D UEs within the D2D group to achieve fine time and/or frequency synchronization, which is different from the design target of the PSS and/or SSS in the LTE communications system.

With respect to PD2DSS signal mapping, the PD2DSS may be obtained as a transformation of a set of frequency domain (Fourier) coefficients. As a non-limiting example, suppose that a discrete time-domain base band signal is obtained as:

$$s_u[k] = \frac{1}{N}\sum_{n=0}^{N-1} H_u[n]W_N^{-kn}, k = 0, 1, \ldots, N-1$$

and $$W_N = \exp\left(-\frac{j2\pi}{N}\right), j = \sqrt{-1}$$

for a set of Fourier frequency coefficients $H_u[l]$, $l=0, 1, \ldots, N-1$.

If the sequence $x_u(l)$, $0 \le l \le L-1$ where $L \le N$, is mapped to the set of Fourier frequency coefficients such that $H_u[l]=H_u[N-l]$, $l=1, \ldots, N-1$, it may be shown that the signal becomes centrally symmetric, e.g., $|s_u[k]|=|s_u[N-k]|$, $k=1, \ldots, N-1$. That is, the Fourier coefficients should be mapped to be symmetric around the DC subcarrier. The PSS is obtained from a symmetric sequence, i.e., a punctured length-63 ZC sequence, which results in a central symmetry according to $s_u[k]=s_u[N-k]$, $k=1, \ldots, N-1$. The centrally symmetric property is advantageous as it may be utilized in the receiver to reduce the amount of complex-valued multiplications when performing a correlation of the received signal and the PD2DSS. For example, when determining a correlation value, symmetric samples may be added in the receiver prior to performing multiplication with the replica sample of the D2DSS, thereby reducing the amount of complex-valued multiplications by approximately 50%. Moreover, it may be shown that if there are two sequences which constitute a complex-conjugated pair, i.e., $x_u(l)=x_y*(l)$, $0\leq l\leq L-1$, and if the signal is centrally symmetric, it follows that $s_u[k]=s_y*[k]$, $k=1, \ldots, N-1$. This property may be further utilized in the receiver to reduce the number of complex-valued multiplications when detecting both of these signals in parallel.

As an illustrative example, a corresponding continuous base band OFDM signal (excluding the cyclic prefix) is generated by (utilizing the periodicity of the discrete Fourier transform $H_u[l]=H_u[N+l]$, $l=0, 1, \ldots, N-1$):

$$s_u(t) = \sum_{k=-N/2}^{N/2-1} H_u[k] \cdot e^{j2\pi k \Delta f t}, 0 \leq t < \frac{1}{\Delta f} = N \cdot T_s$$

where $T_s$ is the sampling period, $\Delta f$ is the subcarrier spacing, and $N=1/T_s\Delta f$. Equivalently, N is the number of subcarriers of the OFDM signal. For notational simplicity, it may be assumed that N is even, and the representation can be generalized to odd N. In prior art LTE communications systems, N=2048 for $\Delta f=15$ kHz. In many practical OFDM communications systems, the DC subcarrier is not modulated, i.e., $H_u[0]=0$ and the limits and indexing of the sum may be changed appropriately.

According to an example embodiment, the PD2DSS is mapped to the Fourier coefficient such that $H_u[l]=H_u[N-l]$, $l=1, \ldots, N-1$ in order to obtain a centrally symmetric signal.

In another illustrative example, a corresponding continuous base band OFDM signal (excluding the cyclic prefix) is generated by (utilizing the periodicity of the discrete Fourier transform $H_u[l]=H_u[N+l]$, $l=0, 1, \ldots, N-1$)

$$s_u(t) = \sum_{k=-N/2}^{N/2-1} H_u[k] \cdot e^{j2\pi (k+\delta) \Delta f t}, 0 \leq t < \frac{1}{\Delta f} = N \cdot T_s$$

where $T_s$ is the sampling period, $\Delta f$ is the subcarrier spacing, $N=1/T_s\Delta f$, and $-1<\delta<1$. According to an example embodiment, a synchronization signal for this signal waveform when $\delta \neq 0$ is designed. This form of signal generation has been used in the UL of the LTE communications system with $\delta=\frac{1}{2}$ where the DC subcarrier can be modulated, and where it is being referred to as an SC-FDMA signal waveform. The offset 6 may be introduced to minimize the impact of distortion in the receiver due to the modulation of the DC subcarrier. It is noted that a centrally symmetric signal, $s_u[k]=-s_u[N-k]$, $k=1, \ldots, N-1$, is obtained, e.g., when $\delta=\frac{1}{2}$ and the Fourier coefficients are symmetric around the DC subcarrier (k=0). This could be obtained by using a symmetric sequence where L is an even integer. The above waveform may be sampled at instances $t=n\cdot T_s$ to obtain the central symmetry for sequences which are symmetrically mapped to Fourier coefficients around the DC subcarrier. The central symmetry differs from that of the PSS in the negative sign. However, this form of central symmetry still retains the reduction in receiver complexity. It is also realized that the mapping of the synchronization sequence differs from that of the PSS, since a set of contiguous subcarriers may be modulated, whereas for the PSS, the DC subcarrier is left un-modulated. An advantage of the example embodiment is that receiver complexity in the UE for the PD2DSS may be reduced, while at the same time using the existing transmitter and receiver mechanisms based on the single carrier frequency division multiple access (SC-FDMA) signal.

According to an example embodiment, a time-domain symmetric PD2DSS SC-FDMA signal is generated.

In an example embodiment, a sequence d(n), $0\leq n<L-1$ where L is an even integer value and $d(n)=d(L-1-n)$, is mapped contiguously to a set of Fourier coefficients, $H_u[l]$, $l=0, 1, \ldots, N-1$, such that the Fourier spectrum of $s_u(t)$ becomes symmetric at the frequencies $(k+\delta)\Delta f$ for a set of integer values k $$\left(\text{e.g.}, k = -\frac{N}{2}, \ldots, \frac{N}{2} - 1\right)$$

where $\delta \neq 0$. As an example, at frequency $\delta \Delta f$ where $\delta = \frac{1}{2}$, the corresponding Fourier coefficient $H_u[0]$, should be equal to the Fourier coefficient $H_u[-1]$ at frequency $-\delta \Delta f$; at frequency $$\frac{3}{2}\Delta f,$$

the corresponding Fourier coefficient $H_u[1]$, should be equal to the Fourier coefficient $H_u[-2]$ at frequency $$-\frac{3}{2}\Delta f,$$

and so on.

In an example embodiment, the sequence d(n) is used for PD2DSS and is generated from a frequency-domain Zadoff-Chu sequence according to expression:

$$d_u(n) = \begin{cases} e^{-j\frac{\pi u n(n+1)}{63}} & n = 0, 1, \ldots, 30 \\ e^{-j\frac{\pi u (n+1)(n+2)}{63}} & n = 31, 32, \ldots, 61 \end{cases}$$

and the length 62 sequence $d_u(n)$ may be mapped according to expression:

$H_u[k]=d(n)$, $n=0, \ldots, 61$ $k=n-31$

The sequence d(n) is a punctured ZC sequence of length 62, which is obtained from a ZC sequence of length 63.

According to an example embodiment, a discovery sequence is used at the same location of the PSS, but with a different length and/or root index in order to avoid legacy UEs synchronizing with a UE instead of an eNodeB. An example embodiment provides a location mapping for the PSS. An example embodiment works with existing LTE synchronization design to simplify design hardware, standardization efforts, and the like. An example embodiment also allows legacy UEs to still operate on a network where D2D UEs are used.

Figure 6:
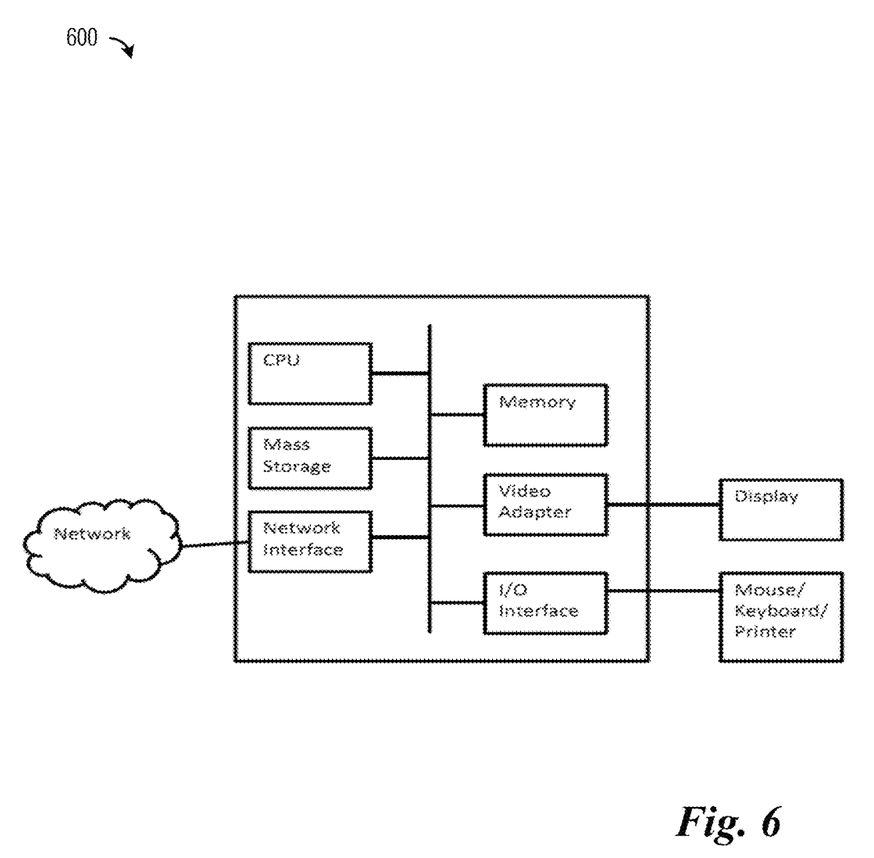
FIG. 6 illustrates an example computing platform that may be used for implementing, for example, the devices and methods described herein, according to example embodiments described herein.

FIG. 6 is a block diagram of a processing system 600 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 7:
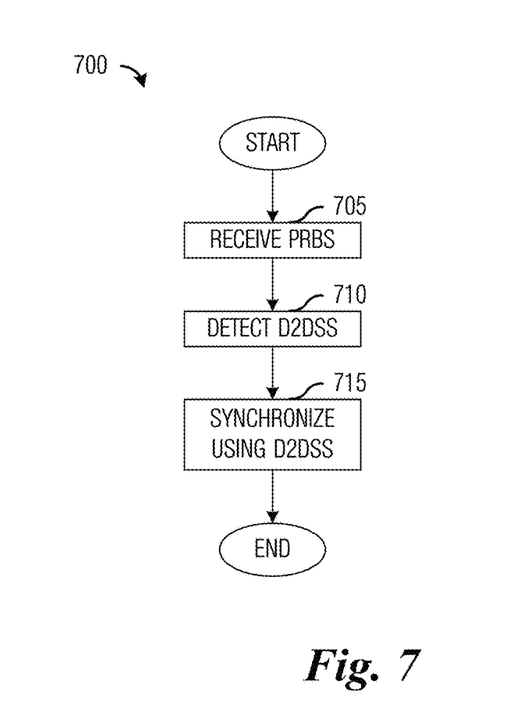
FIG. 7 illustrates a flow diagram of example operations occurring in a D2D communications device synchronizes using a D2DSS according to example embodiments described herein.

FIG. 7 illustrates a flow diagram of example operations 700 occurring in a D2D communications device synchronizes using a D2DSS. Operations 700 may be indicative of operations occurring in a D2D communications device as the device synchronizes using a D2DSS.

Operations 700 may begin with the D2D communications device receiving a plurality of PRBs (block 705). Included in the plurality of PRBs may be a PD2DSS. The PD2DSS may be generated using techniques such as those described herein. The P2DSS may be transmitted in a SC-FDM waveform. The plurality of PRBs may also include a SD2DSS. The SD2DSS may be generated using techniques such as those described herein. The D2D communications device may detect the PD2DSS (710). The D2D communications device may also detect the SD2DSS. The D2D communications device may synchronize using the PD2DSS (and potentially the SD2DSS) (block 715).

Figure 8:
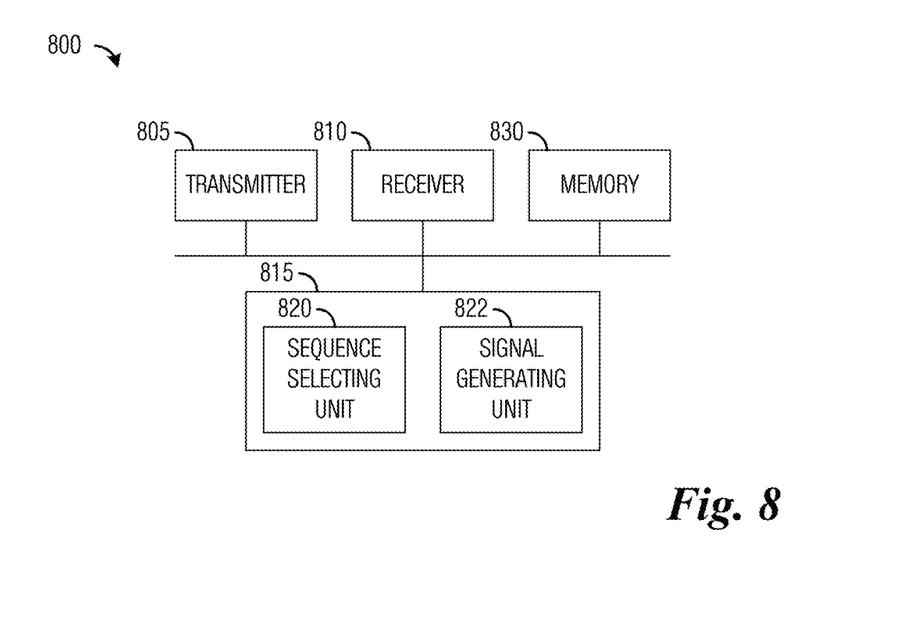
FIG. 8 illustrates an example communications device according to example embodiments described herein.

FIG. 8 illustrates an example communications device 800. Communications device 800 may be an implementation of a device operating as a D2D synchronization source, such as a D2D UE. Communications device 800 may be used to implement various ones of the embodiments discussed herein. As shown in FIG. 8, a transmitter 805 is configured to transmit packets, D2DSS, PD2DSS, SD2DSS, and the like. Communications device 800 also includes a receiver 810 that is configured to receive packets, and the like.

A sequence selecting unit 820 is configured to select a sequence used to derive a D2DSS. Sequence selecting unit 820 is configured to select a ZC sequence. Sequence selecting unit 820 is configured to select a ZC sequence with a length that is different from a length of another ZC sequence used to generate LTE PSS, as well as the length of sequences used to generate other signals transmitted in the uplink of communications device 800, such as DMRS, SRS, and the like. Sequence selecting unit 820 is configured to select a root index of a ZC sequence that is different from a root index of another ZC sequence used to generate LTE PSS, as well as the root index of sequences used to generate other signals transmitted in the uplink of communications device 800, such as DMRS, SRS, and the like. A signal generating unit 822 is configured to generate a D2DSS, a PD2DSS, a SD2DSS, and the like, in accordance with the sequence selected by sequence selecting unit 820. A memory 830 is configured to store sequences, ZC sequences, lengths, root indices, signals, and the like.

The elements of communications device 800 may be implemented as specific hardware logic blocks. In an alternative, the elements of communications device 800 may be implemented as software executing in a processor, controller, application specific integrated circuit, or so on. In yet another alternative, the elements of communications device 800 may be implemented as a combination of software and/or hardware.

As an example, receiver 810 and transmitter 805 may be implemented as a specific hardware block, while sequence selecting unit 820 and signal generating unit 822 may be software modules executing in a microprocessor (such as processor 815) or a custom circuit or a custom compiled logic array of a field programmable logic array. Sequence selecting unit 820 and signal generating unit 822 may be modules stored in memory 830.

Although the present disclosure and its advantages have been described in detail, it should be understood that various changes, substitutions and alterations can be made herein without departing from the spirit and scope of the disclosure as defined by the appended claims.

What is claimed is:

1. A method for device-to-device communications, the method comprises:
generating, by a synchronization source, a synchronization sequence in accordance with a first sequence, a first root index of the first sequence being different from a second root index of a second sequence used to generate a primary synchronization signal (PSS);
mapping, by the synchronization source, the synchronization sequence onto contiguous subcarriers to produce a centrally symmetric primary device-to-device synchronization signal that is different from the PSS sent by an Evolved NodeB (eNodeB) and is different from an existing uplink (UL) signal sent by device-to-device communications devices; and wirelessly transmitting, by the synchronization source, the centrally symmetric primary device-to-device synchronization signal in a single carrier frequency division multiple access (SC-FDMA) waveform.

2. The method of claim 1, wherein the first sequence comprises a first punctured Zadoff-Chu (ZC) sequence, and wherein the second sequence comprises a second punctured ZC sequence.

3. The method of claim 2, wherein the first punctured ZC sequence and the second punctured ZC sequence are the same.

4. The method of claim 1, wherein mapping the centrally symmetric primary device-to-device synchronization signal comprises mapping the synchronization sequence to the contiguous subcarriers so that the centrally symmetric primary device-to-device synchronization signal is centrally symmetric.

5. The method of claim 4, wherein for N samples of the centrally symmetric primary device-to-device synchronization signal, the centrally symmetric primary device-to-device synchronization signal is centrally symmetric according to $s[k]=-s[N-k]$, $k=1,\ldots,N-1$, where N is an integer value.

6. The method of claim 1, wherein the centrally symmetric primary device-to-device synchronization signal is generated in accordance with $$s_u(t) = \sum_{k=-N/2}^{N/2-1} H_u[k] \cdot e^{j2\pi(k+\delta)\Delta f t}, 0 \le t < \frac{1}{\Delta f} = N \cdot T_s,$$

and wherein the synchronization sequence is mapped to at most N coefficients of H[ ], where $T_s$ is a sampling period, $\Delta f$ is a subcarrier spacing, u is the first root index, $N=1/T_s\Delta f$, and $\delta=\frac{1}{2}$.

7. The method of claim 6, wherein the synchronization sequence is expressible as $$d_u(n) = \begin{cases} e^{-j\frac{\pi u n(n+1)}{63}} & n=0,1,\ldots,30 \\ e^{-j\frac{\pi u(n+1)(n+2)}{63}} & n=31,32,\ldots,61 \end{cases},$$

and wherein the synchronization sequence is mapped in accordance with:

$H_u[k]=d(n), n=0,\ldots,61,$ $k=n-31$ where u is the first root index.

8. The method of claim 1, wherein lengths of the first sequence and the second sequence are different.

9. The method of claim 1, wherein the first root index is selected in accordance with an identifier of the synchronization source.

10. The method of claim 1, wherein the first root index is selected in accordance with a type of the synchronization source.

11. The method of claim 1, wherein the centrally symmetric primary device-to-device synchronization signal is transmitted without discrete Fourier transform (DFT) pre-coding.

12. The method of claim 1, further comprising generating a secondary device-to-device synchronization signal in accordance with a third sequence with a first length value that is different from a second length value of a fourth sequence used to generate a secondary synchronization signal sent by the eNodeB.

13. A method of operating a device-to-device communications device, the method comprising:

wirelessly receiving, by the device-to-device communications device, a plurality of physical resource blocks (PRBs) including a centrally symmetric primary device-to-device synchronization signal that is different from a primary synchronization signal (PSS) sent by an Evolved NodeB (eNodeB) and is different from an existing uplink (UL) signal sent by device-to-device communications devices, the centrally symmetric primary device-to-device synchronization signal being received in a single carrier frequency division multiple access (SC-FDMA) waveform, the centrally symmetric primary device-to-device synchronization signal produced from a synchronization sequence mapped onto contiguous subcarriers, the synchronization sequence generated in accordance with a first sequence, a first root index of the first sequence being different from a second root index of a second sequence used to generate the PSS;

detecting, by the device-to-device communications device, the centrally symmetric primary device-to-device synchronization signal in the plurality of PRBs; and synchronizing, by the device-to-device communications device, in accordance with the centrally symmetric primary device-to-device synchronization signal.

14. The method of claim 13, wherein the centrally symmetric primary device-to-device synchronization signal is generated in accordance with a first sequence, wherein a first root index of the first sequence is different from a second root index of a second sequence used to generate the PSS.

15. The method of claim 14, wherein the first sequence comprises a first punctured Zadoff-Chu (ZC) sequence, and wherein the second sequence comprises a second punctured ZC sequence.

16. The method of claim 14, wherein the plurality of PRBs further comprises a secondary device-to-device synchronization signal generated in accordance with a third sequence with a first length value that is different from a second length value of a fourth sequence used to generate a secondary synchronization signal sent by the eNodeB.

17. A synchronization source comprising:

a processor configured to:
generate a synchronization sequence in accordance with a first sequence, a first root index of the first sequence being different from a second root index of a second sequence used to generate a primary synchronization signal (PSS); and
map the synchronization sequence onto contiguous subcarriers to produce a centrally symmetric primary device-to-device synchronization signal that is different from the PSS sent by an Evolved NodeB (eNodeB) and is different from an existing uplink (UL) signal sent by device-to-device communications devices; and a transmitter operatively coupled to the processor, the transmitter configured to wirelessly transmit the centrally symmetric primary device-to-device synchronization signal in a single carrier frequency division multiple access (SC-FDMA) waveform.

18. The synchronization source of claim 17, wherein the synchronization sequence is expressible as $$d_u(n) = \begin{cases} e^{-j\frac{\pi un(n+1)}{63}} & n = 0, 1, \ldots, 30 \\ e^{-j\frac{\pi u(n+1)(n+2)}{63}} & n = 31, 32, \ldots, 61 \end{cases},$$

where u is the first root index.

19. The synchronization source of claim 17, wherein the first sequence comprises a first punctured Zadoff-Chu (ZC) sequence, and wherein the second sequence comprises a second punctured ZC sequence.

20. The synchronization source of claim 19, wherein the first punctured ZC sequence and the second punctured ZC sequence are the same.

21. The synchronization source of claim 17, wherein the processor is configured to map the synchronization sequence to the contiguous subcarriers so that the centrally symmetric primary device-to-device synchronization signal is centrally symmetric.

22. A method for device-to-device communications, the method comprises:
generating, by a synchronization source, a synchronization sequence in accordance with a first sequence, a first root index of the first sequence being different from a second root index of a second sequence used to generate a primary synchronization signal (PSS);
mapping, by the synchronization source, the synchronization sequence onto contiguous subcarriers to produce a centrally symmetric primary device-to-device synchronization signal in accordance with $$s_u(t) = \sum_{k=-N/2}^{N/2-1} H_u[k] \cdot e^{j2\pi(k+\delta)\Delta ft}, 0 \le t < \frac{1}{\Delta f} = N \cdot T_s,$$

the synchronization sequence being mapped to at most N Fourier coefficients of H[ ], where $T_s$ is a sampling period, $\Delta f$ is a subcarrier spacing, u is a first root index, N is an integer value, and $\delta=\frac{1}{2}$, the centrally symmetric primary device-to-device synchronization signal being different from the PSS sent by an Evolved NodeB (eNodeB) and being different from an existing uplink (UL) signal sent by device-to-device communications devices; and
wirelessly transmitting, by the synchronization source, the centrally symmetric primary device-to-device synchronization signal in a single carrier frequency division multiple access (SC-FDMA) waveform.

23. The method of claim 22, wherein the Fourier coefficients are obtained from a symmetric sequence of even length.

24. The method of claim 22, further comprising mapping the centrally symmetric primary device-to-device synchronization signal contiguously to a set of Fourier coefficients, $H_u[l]$, $l=0, 1, \ldots, N-1$, such that a Fourier spectrum of $s_u(t)$ is symmetric at frequencies $(k+\delta)\Delta f$ for a set of integer values k where $\delta \ne 0$.

25. The method of claim 24, wherein at a frequency $\delta\Delta f$, a corresponding Fourier coefficient $H_u[0]$, is equal to a Fourier coefficient $H_u[-1]$ at a frequency $-\delta\Delta f$.

26. A device-to-device (D2D) communication device comprising:
a processor; and
a receiver operatively coupled to the processor;
wherein the receiver is configured to wirelessly receive a plurality of physical resource blocks (PRBs) including a centrally symmetric primary device-to-device synchronization signal that is different from a primary synchronization signal (PSS) sent by an Evolved NodeB (eNodeB) and is different from an existing uplink (UL) signal sent by device-to-device communications devices, wherein the centrally symmetric primary device-to-device synchronization signal is received in a single carrier frequency division multiple access (SC-FDMA) waveform, the centrally symmetric primary device-to-device synchronization signal produced from a synchronization sequence mapped onto contiguous subcarriers, the synchronization sequence generated in accordance with a first sequence, a first root index of the first sequence being different from a second root index of a second sequence used to generate the PSS; and
wherein the processor is configured to detect the centrally symmetric primary device-to-device synchronization signal in the plurality of PRBs; and synchronize in accordance with the centrally symmetric primary device-to-device synchronization signal.

27. The D2D communication device of claim 26, wherein the centrally symmetric primary device-to-device synchronization signal is generated in accordance with a first sequence, wherein a first root index of the first sequence is different from a second root index of a second sequence used to generate the PSS.

28. The D2D communication device of claim 27, wherein the first sequence comprises a first punctured Zadoff-Chu (ZC) sequence, and wherein the second sequence comprises a second punctured ZC sequence.

29. A processor/controller for use in a synchronization source comprising a transmitter coupled to the processor/controller, the processor/controller configured to:
generate a synchronization sequence in accordance with a first sequence, a first root index of the first sequence being different from a second root index of a second sequence used to generate a primary synchronization signal (PSS);
mapping, by the synchronization source, the synchronization sequence onto contiguous subcarriers to produce a centrally symmetric primary device-to-device (D2D) synchronization signal that is different from the PSS sent by an Evolved NodeB (eNodeB) and is different from an existing uplink (UL) signal sent by D2D communications devices; and
wirelessly transmit the centrally symmetric primary D2D synchronization signal in a single carrier frequency division multiple access (SC-FDMA) waveform.

30. A processor/controller for use in a device-to-device (D2D) communication device comprising a receiver coupled to the processor/controller, the processor/controller configured to:
wirelessly receive a plurality of physical resource blocks (PRBs) including a centrally symmetric primary D2D synchronization signal that is different from a primary synchronization signal (PSS) sent by an Evolved NodeB (eNodeB) and is different from an existing uplink (UL) signal sent by D2D communications devices, the centrally symmetric primary D2D synchronization signal being received in a single carrier frequency division multiple access (SC-FDMA) waveform, the centrally symmetric primary D2D synchronization signal produced from a synchronization sequence mapped onto contiguous subcarriers, the synchronization sequence generated in accordance with a first sequence, a first root index of the first sequence being different from a second root index of a second sequence used to generate the PSS;
detect the centrally symmetric primary D2D synchronization signal in the plurality of PRBs; and
synchronize in accordance with the centrally symmetric primary D2D synchronization signal.

* * * * *